No. 841,688. PATENTED JAN. 22, 1907.
A. J. HODGES.
NUT LOCK.
APPLICATION FILED FEB. 6, 1906.

Witnesses

Inventor
A. J. Hodges
By R. A. B. Lacey,
Attorneys

UNITED STATES PATENT OFFICE.

AMOS J. HODGES, OF EL PASO, TEXAS.

NUT-LOCK.

No. 841,688.　　　Specification of Letters Patent.　　　Patented Jan. 22, 1907.

Application filed February 6, 1906. Serial No. 299,784.

*To all whom it may concern:*

Be it known that I, AMOS J. HODGES, a citizen of the United States, residing at El Paso, in the county of El Paso and State of Texas, have invented certain new and useful Improvements in Nut-Locks, of which the following is a specification.

This invention relates to improvements in nut-locks.

For a full description of the invention and the merits thereof and also to acquire a knowledge of the details of construction of the means for effecting the result reference is to be had to the following description and accompanying drawings, in which—

Figure 1:
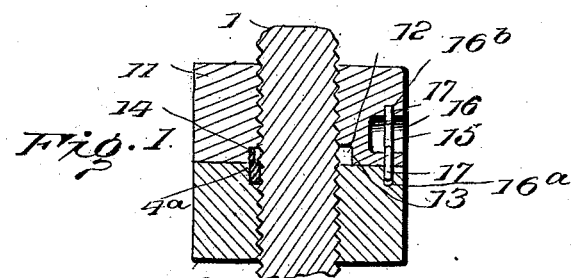
Figure 2:
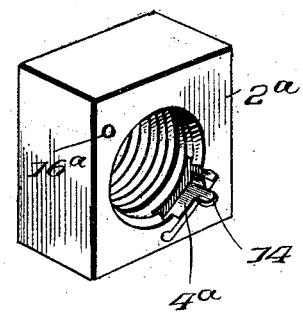
Figure 3:
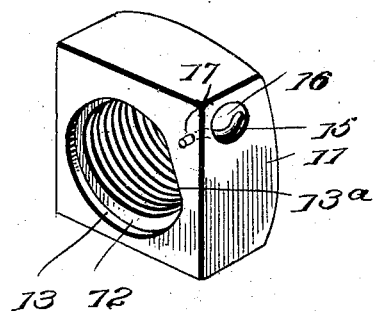
Figure 3:
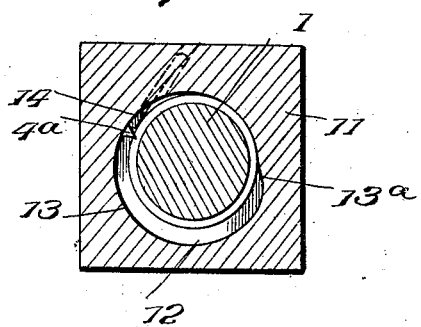
Figure 4:
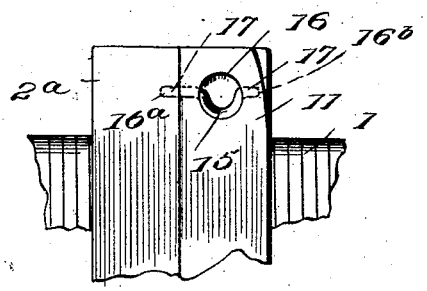

Figure 1 is a vertical sectional view of a nut-lock embodying the invention. Fig. 2 is a perspective view of the invention, showing more clearly the form of the two nuts used located in separated positions. Fig. 3 is a horizontal sectional view through the outer nut. Fig. 4 is a side elevation, parts broken away, showing the means for locking the two nuts together.

Corresponding and like parts are referred to in the following description and indicated in all the views of the drawings by the same reference characters.

In carrying out the invention it is contemplated to utilize a nut $2^a$, having a catch $4^a$ applied thereto, as shown most clearly in Fig. 2 of the drawings, said catch being located upon the outer face of the nut $2^a$ and being preferably secured in place in any suitable substantial way admitting of actuation thereof, as hereinbefore set forth. An outer or superposed nut 11, however, is provided, and upon the inner side of said nut and surrounding the bolt-opening therein is formed an annular recess 12, gradually narrowing in its length and forming a vertical wall 13, which terminates at one end at the shoulder $13^a$. When the nut 11 is screwed against the outer side of the nut $2^a$, a projection 14 at the toothed end of the catch $4^a$ is received in the recess 12. Revolution of the nut after the projection 14 is in the recess 12 will cause the cam-shoulder $13^a$ to engage the projection 14, and thereby positively force the catch $4^a$ into engagement with the bolt 1 and prevent displacement of the nut $2^a$ in an evident manner. If desired, to prevent likelihood of unscrewing of the nut 11 a spring 15 may be used for this purpose and will be disposed in a recess 16 in a side of the nut 11, said spring being of semicircular form and having lateral projecting end portions 17, one of which is adapted to engage in an opening in a recess $16^a$ in a side of the nut $2^a$, (shown in dotted lines in Fig. 4,) the other end of which is seated in a depression $16^b$, similarly shown at a side of the recess 16.

From the foregoing it will be noted that a single movement of the revoluble cam device will cause the catch to be engaged with the threaded portion of the bolt, and the above will afford an effective locking means for preventing displacement of nuts.

Having thus described the invention, what is claimed as new is—

1. In a nut-lock, the combination of a bolt, nuts mounted thereon, the innermost of said nuts being provided at its outer side with a catch arranged to engage the bolt and having a projection extending outwardly therefrom, the outermost of said nuts being formed with a recess upon its inner side to receive the projection of the catch, said recess terminating in a cam-shoulder adapted to engage the projection of the catch and to force said catch into engagement with the bolt on rotation of the last-mentioned nut, and means for locking the nuts together when the catch has been operated, as above specified.

2. In a nut-lock, the combination of a bolt, nuts mounted thereon, the innermost of said nuts being provided at its outer side with a catch arranged to engage the bolt and having a projection extending outwardly therefrom, the outermost of said nuts being formed with a recess upon its inner side to receive the projection of the catch, said recess terminating in a cam-shoulder adapted to engage the projection of the catch and to force said catch into engagement with the bolt on rotation of the last-mentioned nut, the outer nut being formed with a recess in one of its sides, and a locking member arranged in said recess, one end of said locking member projecting from the inner side of the outer nut and engaging with the innermost nut to lock the two nuts together, as specified.

In testimony whereof I affix my signature in presence of two witnesses.

AMOS J. HODGES. [L. S.]

Witnesses:
　ROBERT BRUCE SMITH,
　B. F. CRENSHAW.